United States Patent Office 3,282,884
Patented Nov. 1, 1966

3,282,884
NITROSO RUBBER VULCANIZATES AND THEIR PREPARATION
Joseph Green, Dover, Nathan B. Levine, Colonia, and Robert C. Keller, Morris Plains, N.J., assignors to Thiokol Chemical Corporation, Bristol, Pa., a corporation of Delaware
No Drawing. Filed Nov. 1, 1963, Ser. No. 320,923
19 Claims. (Cl. 260—41)

This invention relates to novel method of vulcanizing perhalonitrosalkane - perhaloalkylene polymers known as nitroso rubbers.

More particularly, this invention concerns the preparation of novel nitroso rubber polymers through the use of novel vulcanizing agents. The resultant nitroso elastomers are useful for fabricating materials resistant to solvents, oxidizing agents and for protective clothing in atomic attack.

Within recent years much effort has been expended on the vulcanization of nitroso rubber gums. These rubber gums are of considerable interest because they possess certain valuable physical and chemical characteristics. For example the nitroso rubber gums are nonflammable, retain their elasticity at low temperatures and are resistant to most nonhalogenated solvents. In addition, they are the only elastomers known to be resistant to the potent halogen containing oxidizers such as chlorine trifluoride ($ClF_3$) and the like.

Because of their inert nature that makes them so potentially valuable, the nitroso rubbers are difficult to cure. For example, the usual curing systems of the rubber art i.e. sulfur, peroxide or metallic oxides give unsatisfactory vulcanizates. Similarly, irradiation of the elastic gum stock by beta and gamma rays does not effect a satisfactory cure. Instead of a utilizable crosslinked nitroso rubber, a tacky gel is obtained.

Recently, there has been a good deal of work on the use of amines or amine derivatives in curing nitroso gums. However, the resultant cured nitroso rubbers have relative poor properties. For instance, they have very low tensile strengths, usually below 300 p.s.i. These poor properties are at least partially attributed to poor crosslinking. Since these tensile strengths are only a fraction of what is required for a satisfactory nitroso rubber much effort has been given to improve the curing systems of the prior art. Two approaches have been generally taken, one in the choice of vulcanizing agents. Using silica as a reinforcing agent and amines as the vulcanizing agents, nitroso rubbers having a tensile strength of about 700 p.s.i. have been obtained. Unfortunately these silica-reinforced nitroso rubbers are reactive with the halogen containing oxidizers such as $ClF_3$ and rapidly degrade after contact with them. It is presumed that the silica filler reacts with the halogens and is volatilized as a gas at ambient temperatures. In addition, even these higher tensile strengths are still much too low for requirements. Because of these shortcomings of the prior art, the development of new crosslinking agents which in combination with the appropriate reinforcing fillers would produce nitroso rubbers having superior physical and chemical properties is much desired. These novel vulcanizing systems and nitroso vulcanizates would represent a significant advance in the art.

Thus it is an object of this invention among many others to prepare novel nitroso rubber vulcanizates suitable for fabrication and use as enclosures, gaskets, seals, connectors and the like.

More particularly, it is an object of this invention to prepare trifluoronitrosomethane - tetrafluoroethylene vulcanizates having improved physical and chemical properties.

Still a more specific object of this invention is to prepare trifluoronitrosomethane - tetrafluoroethylene vulcanizates having greatly improved tensile strength.

Yet another specific object of this invention is to prepare trifluoronitrosomethane - tetrafluoroethylene vulcanizates having improved resistance to halogen containing oxidizers such as $ClF_3$.

An additional specific object of this invention is the preparation of trifluoronitrosomethane - tetrafluoroethylene vulcanizates having low temperature applications.

A further specific object of this invention is the preparation of trifluoronitrosomethane - tetrafluoroethylene vulcanizates having superior solvent resistance.

A more general object of this invention is the disclosure of heretofore unreported vulcanizing agents for the crosslinking of perfluoronitrosoalkane - perfluoroalkylene polymer gums.

Additional objects will become apparent after a further perusal of this patent application.

The above objects among others are achieved by milling and vulcanizing a formulation having as its essential ingredients perhalonitrosoalkane - perfluoroalkylene gum stock, preferably trifluoronitrosomethane - tetrafluoroethylene gum stock and the novel vulcanizing agents of this invention with the usual optional filler materials of the rubber art.

The novel vulcanizing agents of this invention are the alkali metal salts, preferably the sodium salts of the members of the group consisting of the aromatic diphenols, the aromatic polyphenols, the halogenated aromatic diphenols, the halogenated aromatic polyphenols, the halogenated alkanepolyols.

Illustrative aromatic diphenols and polyphenols include resorcinol, catechol, hydroquinone and pyrogallol. An illustrative polyhalogenated aromatic diphenol is tetrachlorohydroquinone. Typical halogenated alkanediols and polyols include tetrafluorobutanediol and hexafluoropentanediol. As indicated above the compounded and milled formulations are cured and post cured for optimum results.

Superior elastomer products have resulted from compounding, milling and vulcanizing the essential trifluoronitrosomethane - tetrafluoroethylene gum stocks with the sodium salts of the aromatic diphenols and polyphenols to which has been added the usual rubber additives and fillers. These additives, fillers, modifiers, extenders and the like are referred to as rubber adjuvants.

Because of the commercial availability of the sodium salts of the aromatic diphenols and aromatic polyphenols these represent the preferred vulcanizing agents of this invention. Similarly the vulcanizable trifluoronitrosomethane-tetrafluoroethylene gum stock including the essential and preferred sodium vulcanizing agents with or without the afore described optional rubber adjuvants represent the preferred vulcaniaztion nitroso formulations of this invention.

In preferred practice, the trifluoronitrosomethane-tetrafluoroethylene gum stock and the sodium salt of one or more of the aromatic diphenols or polyphenols are combined with the usual optional rubber adjuvants such as fillers are milled and cured at about 250° F. for about one hour, then are post cured at temperatures between 150–300° F. for a period of at least eight hours or for as long a period that is required to produce an elastomer having the desired degree of resiliency.

In one preferred embodiment of this invention the following formulation is prepared by milling the listed ingredients curing for 60 minutes at 250° F. and post curing at 212° F. for 18 hours.

Ingredients

Trifluoronitrosomethane-tetrafluoroethylene gum -- 100
Calcium fluoride -- 15
Disodium salt of resorcinol -- 5

A crosslinked insoluble rubber is obtained which has superior properties compared to the amine cured elastomers of the prior art.

In another preferred embodiment the above gum is combined with 15 parts by weight of Hi-Sil 303, a commercially available silica filler, and 2.5 parts by weight of the disodium salt of resorcinol. The ingredients are milled and cured at 225° F. for 75 minutes, followed by post curing at 236° F. for 13 hours. Again a useful rubber is produced.

The following preferred embodiments were also carried out with minor changes, that is, curing for 60 minutes at 250° F. and post curing for 18 hours at 212° F.

| Ingredients | Amounts of Materials (phr.) | | | | |
|---|---|---|---|---|---|
| | Run 3 | Run 4 | Run 5 | Run 6 | Run 7 |
| Nitroso Gum Described above | 100 | 100 | 100 | 100 | 100 |
| Calcium Fluoride | 15 | 15 | 15 | 15 | 15 |
| Disodium Salt of Resorcinol | 1 | 2.5 | 5 | 20 | 20 |
| Silica Filler (Hi-Sil 303) | | | | 15 | |

The cured elastomers ranged in properties from partially cured products at the low curative level to resinous materials at the high curative level. The amount of vucanizing salt is not critical as long as a sufficient amount is utilized to provide a practical cure within a reasonable time. That is, greater amounts can be used but amounts in excess of the required amounts are generally not advantageous unless an unusually hard vulcanizate is desired. Similarly the type and amount of filler or fillers used is not a critical factor. For example, the choice of filler as well as the quantity of filler used is dictated by a number of considerations including cost and the type of product desired. Filler materials are described in exhaustive detail throughout the technical literature and include among many others carbon flocks and mineral fillers. Examples of some of the many fillers which can be used are clays, silicas, metallic silicates, metallic carbonates and metallic oxides. Representative examples are kaolin, hydrated silica, alumina, calcium carbonate, aluminum silicate, titanium oxide and the like. The amount of filler can range from 5 to 200 parts by weight of filler to 100 parts by weight of gum stock.

An additional embodiment of this invention can be seen by admixing a nitroso gum (100 parts by weight) and 20 parts by weight of silica and 5 parts by weight of the disodium salt of catechol. The rubber is cured at 220° F. for 75 minutes and post cured at 260° F. for 10 hours. A crosslinked elastomer is obtained.

Another embodiment of this invention is prepared by admixing 10 parts by weight of tetrafluorohydroquinone disodium salt and 100 parts by weight of nitroso copolymer gum. The compounded mixture is heated to 212° F. for 60 minutes and then post cured for 8 hours at 275° F. Again a crosslinked rubber is produced.

Another embodiment of this invention is prepared by admixing 10 parts by weight of tetrachlorohydroquinone disodium salt and 100 parts by weight of nitroso copolymer gum. The compounded mixture is heated to 212° F. for 60 minutes and then post cured for 8 hours at 275° F. Again a crosslinked rubber is produced.

Yet another embodiment of this invention is as follows: A 100 parts by weight portion of commercially produced $CF_3NO$—$C_2F_4$ copolymer gum ($n=0.825$), 10 parts by weight of the disodium salt of hexafluoropentanediol, and 15 parts by weight of magnesium bromide are milled as before and cured at about 250° F. for 30 minutes and post cured at 225° F. for 16 hours. This vulcanizate formulation can be varied as to type and content of filler to modify the physical properties of the crosslinked rubber.

Yet a further embodiment of this invention is the preparation below:

A 100 parts by weight sample of $CF_3NO$—$C_2F_4$ copolymer gum is milled with 15 parts by weight of the disodium salts of tetrafluorobutanediol, and 20 parts by weight of silica. The formulation is cured at 220° F. for 1 hour and post cured to 240° F. for 14 hours, yielding a cured $CF_3NO$—$C_2F_4$ rubber.

In still a further embodiment of the inventive concept, a 100 parts by weight sample of $CF_3NO$—$C_2F_4$ copolymer gum is milled with 5 parts by weight of the disodium salt of pyrocatechin and 20 parts by weight of silica. The compounded ingredients are cured first at 230° F. for 45 minutes then post cured for 6 hours at 270° F. A satisfactory rubber is obtained.

Still a further embodiment is shown by milling a 100 parts by weight sample of $CF_3NO$—$C_2F_4$ copolymer gum, 20 parts by weight of alumina and 10 parts by weight of the trisodium salt of pyrogallol.

The compounded mixture is cured at 240° F. for 45 minutes and post cured at 260° F. for 12 hours to give a thermally formable rubber.

As can be seen from the above description and illustrative embodiments, considerable latitude exists in this invention. For instance, the following modifications and variations can be made without departing from the inventive concept.

For example, various nitrosoalkane and perhaloalylenes can be utilized as reactants to prepare the polymer raw gums used as starting materials. To illustrate this, any of the following perhaloalkylenes can be used: $CF_2=CF_2$, $CF_2=CR_2$, $CCl_2=CCl_2$, $CCl_2=CF_2$, $CF_2=CFH$, or the like where R is a member of the group consisting of Cl, Br, H, F and alkyl radicals. Typical nitrosoalkanes which can be used are trifluoronitrosomethane, pentafluoronitrosoethane, tetrafluoronitronitrosoethane, heptafluoronitrosopropane, hexafluoronitronitrosopropane, mononitrosoperfluorobutane, mononitrosoperfluorooctane, trifluorodichloronitrosethane, 1 - nitroso-1,3,5,7,7-hexachlorononafluoroheptane, and 1-nitroso-1,3,5,7,9,9,9-heptachlorododecafluorononane, or alternatively the inventive process is performed using available nitroso-perhalogenatedalkylene polymer gums. This includes the co and terpolymer. In either instance the mole weight of the polymers can be between 50,000 and 2,000,000 and will have an inherent viscosity generally between 0.3 and about 2.0. The polymer is a 1:1 ratio mixture of the two fluoro reactants.

The ratio of the dialkyli metal vulcanizing salt will vary between 1–50 parts of the vulcanizing agent to each 100 parts of nitroso polymer gum excluding fillers, additives and the like. As indicated earlier, the rubber adjuvants can be present in amounts varying from 5 to 200 parts by weight to each 100 parts of nitroso gum stock. Preferably the vulcanizing salt will vary between 5–20 parts by weight of salt to 100 parts by weight of nitroso polymer gum. As stated earlier one or more of the usual additives, extenders, fillers and the like common to the rubber art and generically referred to as rubber adjuvants can be added to the gum-vulcanizing salt mixture to modify the characteristics of the cured nitroso rubber. These adjuvants can comprise as much as 200% of the final compounded and milled uncured rubber composition. However, ordinarily they will make up between 10 to 60% of the final uncured composition. The vulcanizing agents including the preferred disodium salts and their halogenated derivatives are known. Many are commercially available compounds whose preparation is described in the technical literature. While no mechanism is advanced to account for the crosslinking of the cured nitroso polymer of this invention, it seems likely that a new elastomer composition has been prepared through the elimination of alkali metal halide resulting in the formation of crosslinks.

However, the physical and chemical properties of the resultant polymer products are superior to the prior art polymers in which amines are used as the vulcanizing agents. Because of these differences it is presumed that a new class of nitroso polymers have been prepared.

This invention is novel in both its process and product aspects. For example, the products are new compositions with novel and advantageous physical and chemical properties.

In addition, no special techniques are required and the post curing is conducted in an air atmosphere at atmospheric pressure.

Finally, any of the obtainable trifluoronitrosoalkane-tetrafluorolalkylene polymers can be used as starting materials, or the polymers can be synthesized from the two reactants.

Additional advantages will be suggested to those skilled in the art after a further reading of this patent application.

It should be noted that none of the foregoing embodiments are to be construed as exemplifying this invention. Numerous changes and modifications can be made without departing from the inventive concept and only the claims define the metes and bounds of this invention.

We claim:

1. A vulcanizable novel perhalonitrosoalkane-perhaloalkylene polymer composition comprising as its essential ingredients, 100 parts by weight of a perhalonitrosoalkane-perhaloalkylene polymer gum and from 2 to 50 parts by weight of a vulcanizing agent selected from the group consisting of the poly-sodium salts of aromatic diphenols, the poly-sodium salts of aromatic polyphenols, the poly-sodium salts of halogenated aromatic diphenols, the poly-sodium salts of halogenated aromatic polyphenols, the poly-sodium salts of halogenatedalkanediols and the poly-sodium salts of halogenatedalkanepolyols.

2. The vulcanizable composition of claim 1 wherein the polymer gum is a trifluoronitrosomethane-tetrafluoroethylene copolymer.

3. The vulcanizable composition of claim 2 wherein the copolymer compositions contain from 5 to 200 parts by weight of rubber adjuvants.

4. A vulcanizing copolymer composition comprising as its essential ingredients, 100 parts by weight of a trifluoronitrosomethane-tetrafluoroethylene copolymer gum and from 2 to 50 parts by weight of the disodium salts of resorcinol.

5. A vulcanizable copolymer composition comprising as its essential ingredients, 100 parts by weight of a trifluoronitrosomethane-tetrafluoroethylene copolymer gum and from 2 to 50 parts by weight of the disodium salt of hydroquinone.

6. A vulcanizable copolymer composition comprising as its essential ingredients, 100 parts by weight of a trifluoronitrosomethane-tetrafluoroethylene copolymer gum and from 2 to 50 parts by weight of the disodium salt of tetrachlorohydroquinone.

7. A vulcanizable copolymer composition comprising as its essential ingredients, 100 parts by weight of a trifluoronitrosomethane-tetrafluoroethylene copolymer gum and from 2 to 50 parts by weight of the disodium salt of tetrafluorohydroquinone.

8. A vulcanizable copolymer composition comprising as its essential ingredients, 100 parts by weight of trifluoronitrosomethane-tetrafluoroethylene copolymer gum and from 2 to 50 parts by weight of the disodium salt of catechol.

9. A vulcanizable copolymer composition comprising as its essential ingredients, 100 parts by weight of a trifluoronitrosomethane-tetrafluoroethylene copolymer gum and from 2 to 50 parts by weight of the disodium salt of pyrogallol.

10. A vulcanizable copolymer composition comprising as its essential ingredients, 100 parts by weight of a trifluoronitrosomethane-tetrafluoroethylene copolymer gum and from 2 to 50 parts by weight of the disodium salt of pyrocatechin.

11. A vulcanizable copolymer composition comprising as its essential ingredients, 100 parts by weight of a trifluoronitrosomethane-tetrafluoroethylene copolymer gum and from 2 to 50 parts by weight of the disodium salt of hexafluoropentanediol.

12. A vulcanizable polymer composition comprising as its essential elements, 100 parts by weight of a trifluoronitrosomethane-tetrafluoroethylene copolymer gum, from 2 to 20 parts by weight of a vulcanizing agent from the group consisting of the poly-sodium salts of aromatic diphenols, the poly-sodium salts of aromatic polyphenols, the poly-sodium salts of halogenated aromatic diphenols, the poly-sodium salts of halogenated aromatic polyphenols, the poly-sodium salts of halogenated alkanediols and the poly-sodium salts of halogenated alkanepolyols, and from 5 to 200 parts by weight of a filler material.

13. The vulcanizable polymer of claim 12 wherein the vulcanizing agent is disodium salt of resorcinol and the filler material is silica.

14. The vulcanizable polymer of claim 12 wherein the vulcanizing agent is the disodium salt of resorcinol and the filler material is calcium fluoride.

15. The vulcanizable polymer of claim 12 wherein the vulcanizing agent is the disodium salt of hydroquinone and the filler material is silica.

16. The vulcanizable polymer composition wherein the vulcanizing agent is the disodium salt tetrachlorohydroquinone and the filler material is silica.

17. The vulcanizable polymer composition wherein the vulcanizing agent is the disodium salt of tetrafluoroquinone and the filler material is silica.

18. The method of improving the resistance of perhalonitrosoalkane-perhaloalkylene polymers to halogenated oxidizers by vulcanizing 100 parts by weight of polymer gum excluding rubber adjuvants such as filler with from 2 to 50 parts by weight of a vulcanizing agent selected from the group consisting of the poly-sodium salts of aromatic diphenols, the poly-sodium salts of aromatic polyphenols, the poly-sodium salts of halogenated aromatic diphenols, the poly-sodium salts of halogenated aromatic polyphenols, the poly-sodium salts of perhalogenatedalkanediols and the poly-sodium salts of perhalogenated alkanepolyols.

19. The method of claim 18 wherein the polymer gum is a trifluoronitrosomethane-tetrafluoroethylene copolymer.

No references cited.

MORRIS LIEBMAN, *Primary Examiner.*

J. S. WALDRON, *Assistant Examiner.*

ALLAN LIEBERMAN, *Examiner.*